US011190335B2

(12) United States Patent
Oh et al.

(10) Patent No.: US 11,190,335 B2
(45) Date of Patent: Nov. 30, 2021

(54) METHOD AND APPARATUS FOR PERFORMING NON-UNIQUE DATA PATTERN DETECTION AND ALIGNMENT IN A RECEIVER IMPLEMENTED ON A FIELD PROGRAMMABLE GATE ARRAY

(71) Applicant: Intel Corporation, Santa Clara, CA (US)

(72) Inventors: Boon Hong Oh, Bukit Mertajam (MY); Ivan Fu Sun Teh, Batu Gajah (MY); Chee Seng Tan, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 15/878,348

(22) Filed: Jan. 23, 2018

(65) Prior Publication Data

US 2019/0044695 A1 Feb. 7, 2019

(51) Int. Cl.
*H04L 7/06* (2006.01)
*H04L 29/06* (2006.01)
*H04L 7/00* (2006.01)
*H04L 7/04* (2006.01)

(52) U.S. Cl.
CPC ............. *H04L 7/06* (2013.01); *H04L 7/0087* (2013.01); *H04L 7/042* (2013.01); *H04L 69/28* (2013.01)

(58) Field of Classification Search
CPC ......... H04L 7/06; H04L 7/0087; H04L 7/042; H04L 69/28
See application file for complete search history.

(56) References Cited

U.S. PATENT DOCUMENTS

| | | | | |
|---|---|---|---|---|
| 5,805,583 | A * | 9/1998 | Rakib ................. | H03M 13/256 348/E7.078 |
| 6,263,396 | B1 * | 7/2001 | Cottle .............. | H04N 21/43632 710/263 |
| 6,747,580 | B1 * | 6/2004 | Schmidt ............... | H03M 5/145 341/106 |
| 7,012,935 | B2 * | 3/2006 | Woelk .................... | H04L 25/14 370/503 |
| 7,020,729 | B2 * | 3/2006 | Taborek, Sr. ......... | H04L 12/413 710/305 |
| 7,272,679 | B2 * | 9/2007 | Taborek, Sr. ..... | H04L 12/40032 710/305 |
| 7,352,777 | B2 * | 4/2008 | Caia ...................... | H04J 3/0608 370/242 |
| 7,516,237 | B2 * | 4/2009 | Booth .................... | H04L 12/40 370/465 |

(Continued)

*Primary Examiner* — James M Perez

(57) ABSTRACT

A method for performing pattern detection and alignment on a programmable logic device is disclosed. A word aligner unit, implemented by a hard intellectual property block, is configured to detect a plurality of control characters by recognizing a proper subset of bits that are common among the plurality of control characters. It is determined whether a predetermined number of consecutive control characters has been detected in a frame of data. A boundary location associated with a detected predetermined number of consecutive control characters from the word aligner unit is identified. The frame of data is aligned in response to the boundary location associated with the detected predetermined number of consecutive control characters.

24 Claims, 15 Drawing Sheets

(56) References Cited

U.S. PATENT DOCUMENTS

| | | | |
|---|---|---|---|
| 7,606,341 B2* | 10/2009 | Pereira | H04L 7/0337 |
| | | | 375/224 |
| 8,994,425 B2* | 3/2015 | Venkata | H03K 5/1534 |
| | | | 327/162 |
| 9,141,855 B2* | 9/2015 | Xu | G06K 9/3233 |
| 9,240,804 B2* | 1/2016 | Wortman | H03M 9/00 |
| 9,300,463 B2* | 3/2016 | Oh | G09G 5/006 |
| 9,342,749 B2* | 5/2016 | Li | G06K 9/4609 |
| 9,467,120 B1* | 10/2016 | Song | H04L 7/0331 |
| 9,510,306 B2* | 11/2016 | Yang | H04W 56/0015 |
| 9,529,393 B2* | 12/2016 | Asbjornsen | G06F 3/0338 |
| 9,559,834 B1* | 1/2017 | Oh | H03L 7/00 |
| 9,768,950 B2* | 9/2017 | Liu | H04L 12/40 |
| 9,852,092 B2* | 12/2017 | Leijten | G06F 13/28 |
| 9,888,250 B2* | 2/2018 | Germond | H04N 19/184 |
| 9,928,066 B2* | 3/2018 | Leijten | G06F 9/3853 |
| 10,095,653 B2* | 10/2018 | McGowan | G06F 13/1673 |
| 10,129,013 B1* | 11/2018 | Oh | H04L 7/0091 |
| 10,341,658 B2* | 7/2019 | Peng | H04N 19/117 |
| 10,354,387 B2* | 7/2019 | Lee | G01S 17/46 |
| 10,439,795 B2* | 10/2019 | Oh | H04L 7/0087 |
| 10,456,666 B2* | 10/2019 | Hicks | H04N 5/23232 |
| 10,528,410 B2* | 1/2020 | Hamo | G06F 11/0772 |
| 10,615,955 B2* | 4/2020 | Oh | H04L 7/0087 |
| 10,790,833 B1* | 9/2020 | Zanchi | H03L 7/089 |
| 10,958,411 B2* | 3/2021 | Oh | H03L 7/00 |
| 2003/0091041 A1* | 5/2003 | Caia | H04J 3/0608 |
| | | | 370/386 |
| 2005/0025195 A1* | 2/2005 | Barrett | H04J 3/0608 |
| | | | 370/532 |
| 2005/0111556 A1* | 5/2005 | Endress | H04N 19/91 |
| | | | 375/240.23 |
| 2006/0050707 A1* | 3/2006 | Sterin | H04L 1/08 |
| | | | 370/394 |
| 2007/0079104 A1* | 4/2007 | Heuchert | G06F 12/06 |
| | | | 711/201 |
| 2015/0146915 A1* | 5/2015 | Peng | G06K 9/00986 |
| | | | 382/103 |
| 2015/0288511 A1* | 10/2015 | Oh | H04L 7/0087 |
| | | | 375/343 |
| 2016/0103620 A1* | 4/2016 | Kim | G06F 13/4243 |
| | | | 711/105 |
| 2016/0164668 A1* | 6/2016 | Oh | H04L 7/0087 |
| | | | 375/355 |
| 2016/0344645 A1* | 11/2016 | Zhang | G06F 15/00 |
| 2016/0380714 A1* | 12/2016 | Liu | H04L 12/40 |
| | | | 370/513 |
| 2017/0108941 A1* | 4/2017 | Asbjornsen | G06F 3/03547 |
| 2018/0054605 A1* | 2/2018 | Grubner | H04N 13/239 |
| 2018/0083765 A1* | 3/2018 | Oh | H03M 9/00 |
| 2018/0293198 A1* | 10/2018 | Vertenten | G06F 13/20 |
| 2018/0338063 A1* | 11/2018 | O'Neill | H04N 21/43635 |
| 2019/0044695 A1* | 2/2019 | Oh | H04L 7/042 |
| 2019/0097784 A1* | 3/2019 | Oh | H04L 7/0091 |
| 2019/0147829 A1* | 5/2019 | Ansari | G06T 1/20 |
| | | | 345/506 |
| 2019/0280850 A1* | 9/2019 | Tan | H04L 7/04 |
| 2019/0349609 A1* | 11/2019 | Ellgen | H04N 21/2347 |
| 2020/0235906 A1* | 7/2020 | Oh | H04L 7/0087 |
| 2021/0118453 A1* | 4/2021 | Mehta | G10L 19/008 |

* cited by examiner

| Hexadecimal | Binary |
|---|---|
| 10'h354 | 10'b1101010100 |
| 10'h0ab | 10'b0010101011 |
| 10'h154 | 10'b0101010100 |
| 10'h2ab | 10'b1010101011 |

Data pattern = 7'h54
Pattern Width = 7 bits
Polarity = both

FIG. 4

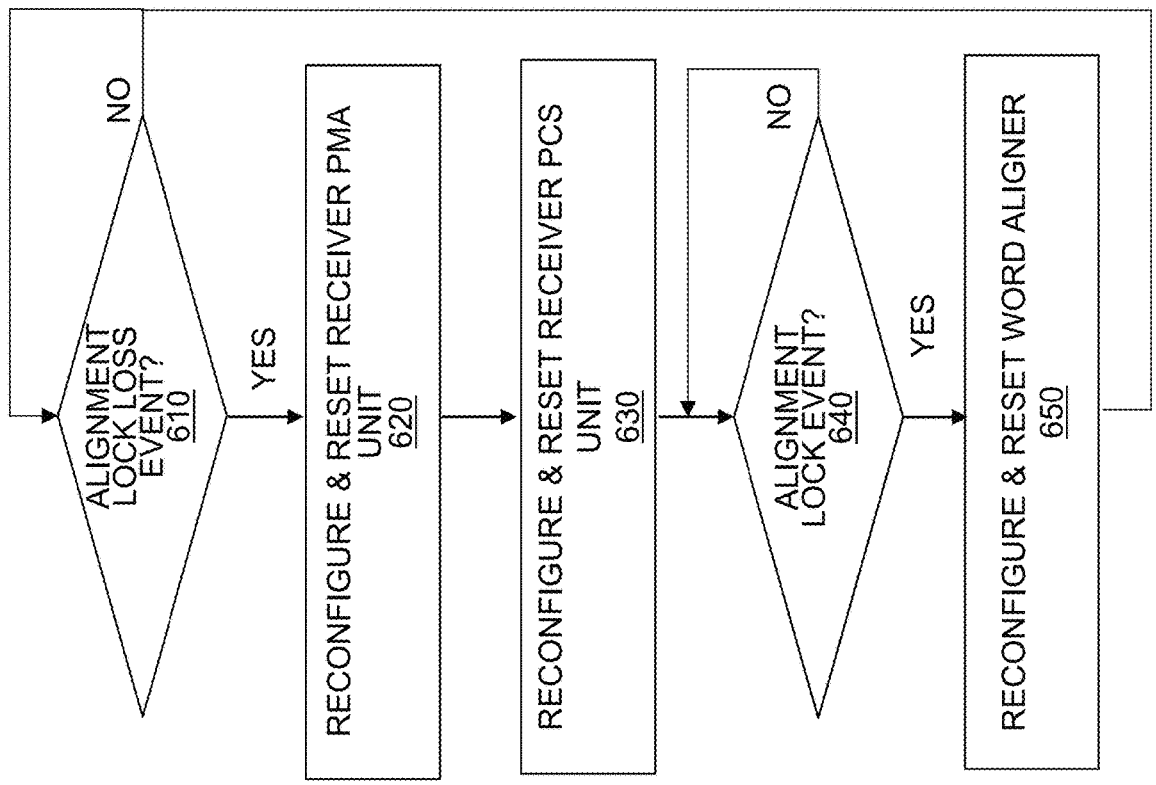

METHOD AND APPARATUS FOR PERFORMING NON-UNIQUE DATA PATTERN DETECTION AND ALIGNMENT IN A RECEIVER IMPLEMENTED ON A FIELD PROGRAMMABLE GATE ARRAY

FIELD

Embodiments of the present disclosure relate to receivers implemented on target devices. More specifically, embodiments of the present disclosure relate to a method and apparatus for performing non-unique data pattern detection and alignment in a receiver implemented by a field programmable gate array.

BACKGROUND

Target devices such as field programmable gate arrays (FPGAs) are semiconductor devices that may be programmed after manufacturing. Instead of being restricted to any predetermined hardware function, an FPGA allows for programming product features and functions, adapting to new standards, and reconfiguring hardware for specific applications even after a product has been installed in the field.

Recent FPGAs include various combinations of configurable embedded static random access memory (SRAM), high-speed transceivers, high-speed input/outputs (I/Os), logic blocks, and routing. FPGAs include programmable logic components called logic elements and a hierarchy of reconfigurable interconnects that allow the logic elements to be physically connected. The logic elements may be configured to perform complex combinational function or simple logic functions. Hard intellectual property (IP) blocks built into or alongside the FPGA's programmable fabric may perform numerous functions while lowering power and cost and free up logic resources for product differentiation. For example, some FPGAs may include hard IP blocks that implement multi-gigabit transceivers and processor cores. These hard IP blocks are built out of transistors instead of from logic elements from the programmable fabric. This allows the hard IP blocks to possess application specific integrated circuit (ASIC) level performance and power consumption while conserving use of the programmable fabric's resources for application specific logic.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIG. 4 illustrates an example of how a word aligner unit detects bits of commonality for control characters in the HDMI 2.0 protocol.

FIG. 6 is a flow chart illustrating procedures performed by a reconfiguration unit according to an exemplary embodiment of the present disclosure.

FIG. 7A illustrates data processed by a receiver physical medium attachment unit according to an exemplary embodiment of the present disclosure.

FIG. 7B illustrates data processed by the receiver physical coding sublayer unit prior to an alignment lock according to an exemplary embodiment of the present disclosure.

FIG. 7C illustrates data processed by the receiver physical coding sublayer unit after an alignment lock according to an exemplary embodiment of the present disclosure.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, components, devices, procedures, and programs are shown in block diagram form to avoid obscuring embodiments of the present disclosure unnecessarily.

According to an embodiment of the present disclosure, a programmable logic device such as a field programmable gate array (FPGA) may be used to implement devices such as transmitters, receivers, and transceivers. When implementing these devices, additional functionalities may need to be performed by the programmable logic device in order to support utilization of the data received. The needed functionalities would be dictated by the protocols and standards supported by the device.

One protocol that has become widely used by audio/video transmitters, receivers, and transceivers is High-Definition Multimedia Interface (HDMI). HDMI is an audio/video interface for transmitting uncompressed video data and compressed or uncompressed digital audio data from a source device, such as a display controller, to a compatible destination device, such as a computer monitor, video projector, digital television, or digital audio device. HDMI protocol design complexity has increased exponentially with recent protocol iterations due to the addition of new frame formats, packet types, encryption, encoding, scrambling, and other additions. In particular, components implementing HDMI face synchronization and timing challenges with new scrambling formats and requirements. For example, HDMI requires that all characters in a video frame be scrambled and then transition minimized differential signaling (TDMS) encoded with the exception of 8 sequential unscrambled control characters. The 8 sequential (consecutive) control characters are sent once per video frame and are used by a receiver for word boundary alignment. The 8 sequential control characters may include any one of the 4 characters, 10'h354, 10'h0ab, 10'h154 or 10'h2ab. The characters are non-unique in that they may reside anywhere among the scrambled and encoded characters, even outside a control period.

Figure 1:
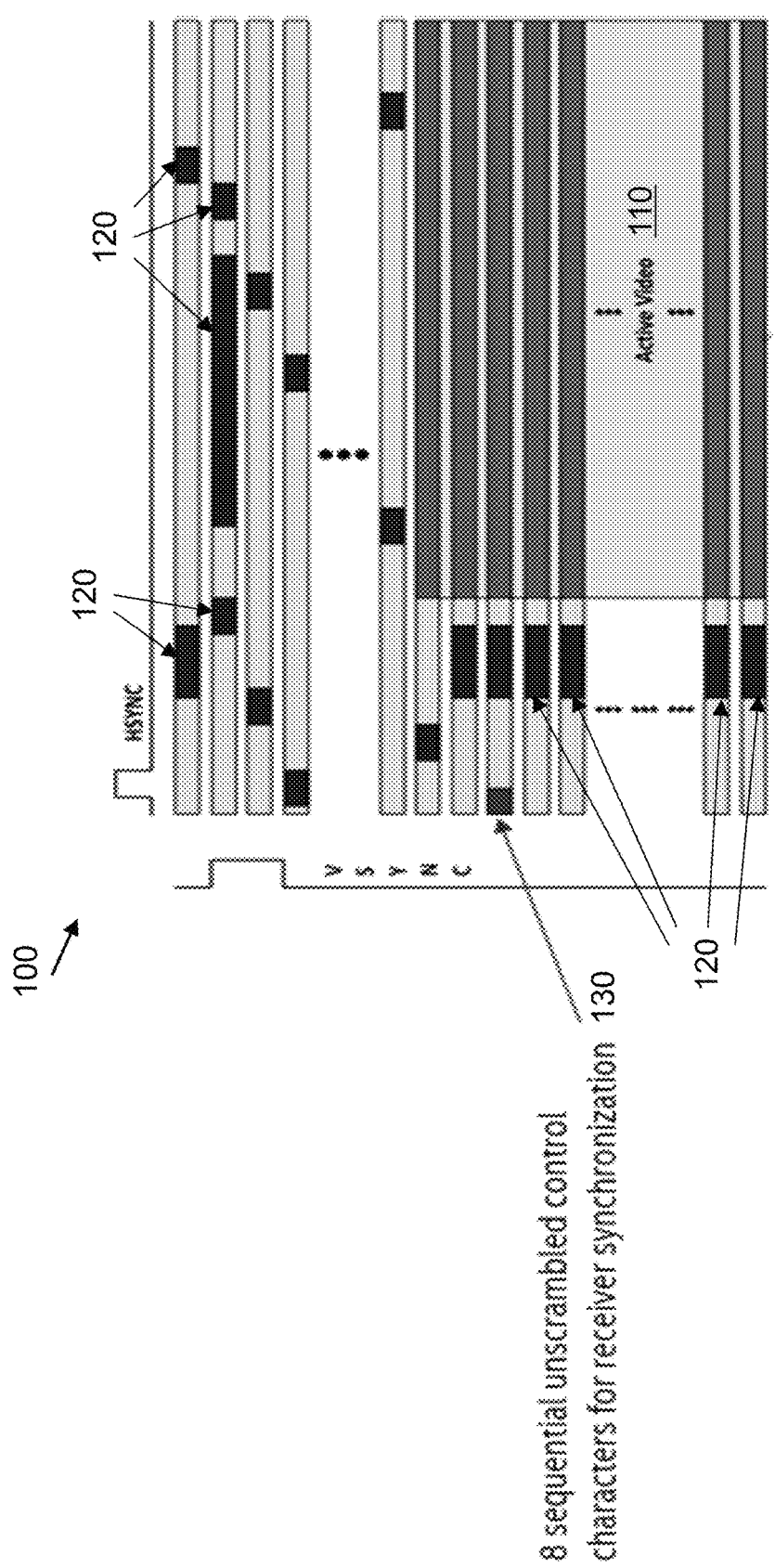
FIG. 1 illustrates a video frame with control characters according to an exemplary embodiment of the present disclosure.

FIG. 1 illustrates an exemplary video frame 100 according to an exemplary embodiment of the present disclosure. The video frame 100 includes active video data 110 and audio data 120. The video frame 100 also includes 8 sequential control characters 130 that reside among the other data in the video frame. The dynamic, infrequent, and non-unique nature of the 8 sequential unscrambled control characters pose challenges to receiver alignment logic for achieving optimum performance in terms of resource utilization, timing, and synchronization lock time. Synchronization lock time is the time needed to identify the 8 sequential control characters and to align data in the video frame in response to a word boundary identified from a location of the 8 sequential control characters (word alignment at the boundary location). Synchronization lock time is important for achieving quick video display time upon cable plugging.

When implementing a receiver in an FPGA, hard IP blocks may be used to perform word alignment. However, hardened word aligners in receivers are typically designed for generic use and are capable of detecting and realigning only a single unique synchronization pattern (control character) at a predetermined bit width. If the synchronization pattern is not unique, utilization of the hardened word aligner would typically not be considered. Other approaches, such as using a purely soft word aligner that is implemented entirely with resources from a programmable fabric (soft logic), requires a longer period of time or high resource utilization in the design.

According to an embodiment of the present disclosure, a technique for performing word alignment is disclosed that utilizes both hard IP blocks (hardened generic purpose word aligner) and resources from a programmable fabric of an FPGA (soft logic) to detect and align non-unique data patterns. This is useful for complying with the requirements of certain protocols such as HDMI 2.0. In this embodiment, a hardened word aligner is programmed to search for pattern commonality among a plurality of control characters. The hardened word aligner is used as a word boundary detector to continuously search for the pattern commonality, immediately realign data in response to a detected control character, and output its respective word boundary. This is performed until a predetermined number of sequential control characters are detected by a separate protocol pattern detector and symbol aligner unit implemented by the programmable fabric of the FPGA. Once alignment lock is identified, the hardened word aligner is dynamically reconfigured to pause the pattern searching and reset to revert the alignment of the programmed data. The word boundary associated with the predetermined number of sequential control characters is used by the protocol pattern detector and symbol aligner unit implemented by the programmable fabric of the FPGA to shift the received parallel data. By utilizing both the hardened word aligner implemented by the hard IP blocks and the protocol pattern detector and symbol aligner implemented by the programmable fabric, word alignment may be performed in both a quick and resource efficient manner which provides a potential technical advantage over previous approaches.

Figure 2:
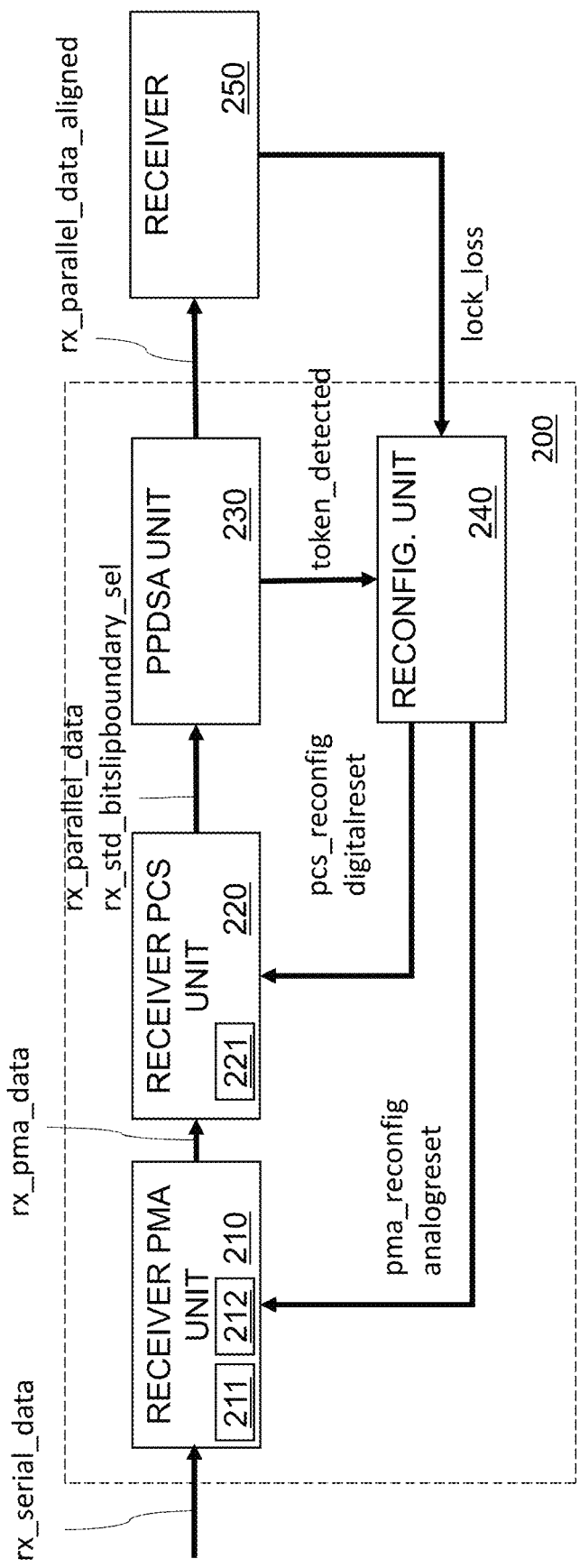
FIG. 2 illustrates a receiver and a receiver interface implemented on a target device according to an embodiment of the present disclosure.

FIG. 2 illustrates a receiver 250 and a receiver interface 200 implemented on a target device according to an embodiment of the present disclosure. The receiver interface 200 transmits to the receiver 250 an aligned frame of data utilizing a boundary location associated with a detected predetermined number of consecutive control characters. Upon detecting an alignment lock loss event, the receiver 250 transmits a notification. An alignment lock loss event may occur when the receiver determines that video resolution has changed, a cable hot-plug has occurred, a signal has been lost or another event has transpired that requires the receiver interface 200 to perform synchronization by determining a new boundary location to align the frame of data.

The receiver interface 200 includes a receiver physical medium attachment (PMA) unit 210. The receiver PMA unit 210 receives high-speed serial data and includes a clock data recovery unit 211 and a deserializer unit 212. The clock data recovery unit 211 recovers a clock from incoming serial data. The deserializer unit 212 clocks in the serial input data using a high-speed serial recovered clock and deserializes the data using a low-speed parallel recovered clock.

The receiver interface 200 includes a receiver physical coding sublayer (PCS) unit 220. The receiver PCS unit 220 includes a word aligner unit 221 and receives deserialized data from the receiver PMA unit 210. The word aligner unit 221 may be programmed to identify a single pattern of a certain predetermined width and polarity and associate its identification with the detection of a control character. The word aligner unit 221 realigns data with a correct word boundary in response to the detected control character. The receiver PCS unit 220 outputs a parallel data stream and a location of a word boundary.

The receiver interface 200 includes a protocol pattern detector and symbol aligner (PPDSA) unit 230. The PPDSA unit 230 receives the parallel data stream from the receiver PCS unit 220 and independently detects a predetermined number of consecutive control characters. According to an embodiment of the present disclosure, the PPDSA unit 230 identifies a pattern of a certain predetermined width and polarity from the parallel data stream and associates its identification with the detection of a control character. The PPDSA unit 230 may detect a pattern, width, and polarity different than the one detected by the receiver PCS 220. For example, the pattern detected by the PPDSA unit 230 may include a greater number of bits than the pattern detected by the receiver PCS 220. Upon detecting the predetermined number of consecutive control characters, the PPDSA unit 230 may generate and send a notification that triggers reconfiguration of the word aligner unit 221 that results in the receiver PCS 220 outputting reverted, unaligned data. The PPDSA unit 230 may then align the reverted data using the appropriate location of the word boundary associated with the detected predetermined number of consecutive control characters.

The receiver interface 200 includes a reconfiguration unit 240. According to an embodiment of the present disclosure, the reconfiguration unit 240 reconfigures and resets the receiver PMA 210 and receiver PCS 220 after being notified of an alignment lock loss event. According to an embodiment of the present disclosure, the receiver PMA 210 is reconfigured to an appropriate bit rate or frequency band that allows it to lock to a new incoming video resolution. The receiver PCS 220 is reconfigured to detect and align data according to its programmed specification. Upon being notified of an alignment lock, the reconfiguration unit 240 reconfigures the receiver PCS unit 220 such that a subsequent alignment does not occur. The receiver PCS unit 220 is also reset to output reverted data that has not been aligned. In an embodiment where the receiver PCS unit 220 cannot be programmed to stop performing detection and alignment, the receiver PCS unit 220 is programmed to identify an invalid pattern such that detection of a control character and alignment will not occur.

According to an embodiment of the present disclosure, the receiver PMA unit 210 and the receiver PCS unit 220 are implemented using hard IP blocks on a programmable logic device, while the PPDSA unit 230 and reconfiguration unit 240 are implemented using resources on a programmable fabric of the programmable logic device (soft logic). By utilizing hard IP blocks to implement the receiver PMA unit 210 and receiver PCS unit 220, and resources on the programmable fabric to implement the PPDSA unit 230 and reconfiguration unit 240, the receiver interface 200 achieves a high level of performance in supporting the functionalities of the HDMI 2.0 protocol without requiring high power consumption or high usage of programmable resources.

Figure 3:
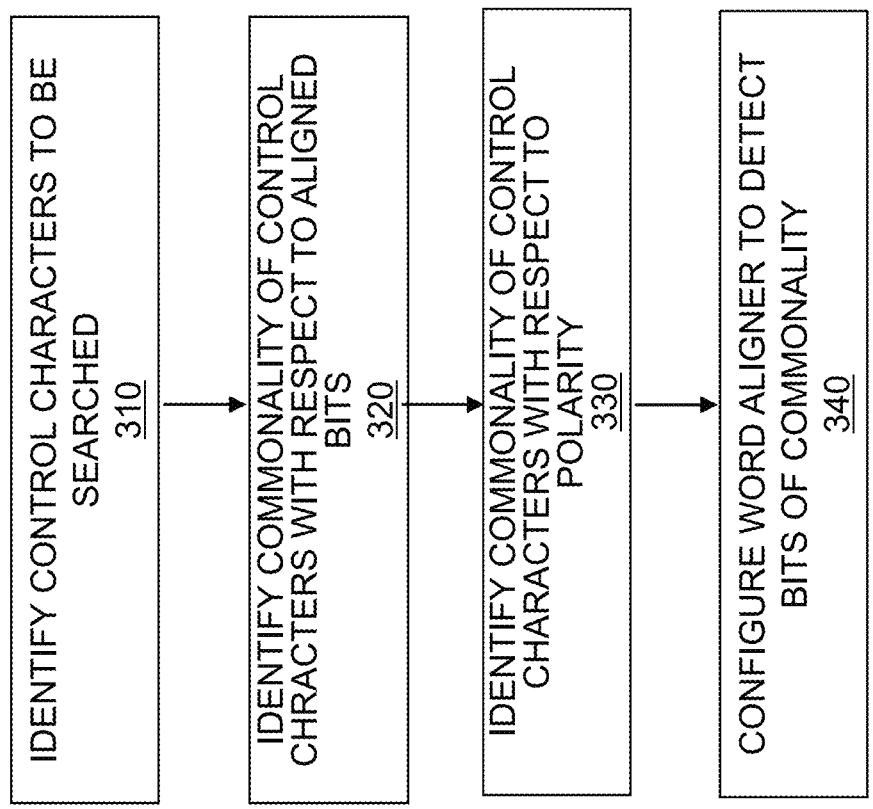
FIG. 3 is a flow chart illustrating a method for configuring a receiver physical coding sublayer unit implemented by a hard intellectual property block according to an exemplary embodiment of the present disclosure.

FIG. 3 is a flow chart illustrating a method for configuring a receiver physical coding sublayer (PCS) unit implemented by hard intellectual property block according to an exemplary embodiment of the present disclosure. The configuring of the receiver PCS unit may be performed upon determining an occurrence of an alignment lock loss event. It should be appreciated that the procedure illustrated in FIG. 3 may also be referred to as reconfiguring the receiver PCS unit. At 310, control characters that are to be searched for in deserialized data from a receiver physical medium attachment (PMA) are identified. According to an embodiment of the present disclosure, the control characters that are to be searched may be recognized by association with an identified standard or protocol or may be received as input by a designer.

At 320, the commonality between the control characters with respect to aligned bits are identified. According to an embodiment of the present disclosure, when the control characters are aligned, bits in the same position sharing the same value are identified.

At 330, the commonality between the control characters with respect to polarity is identified. When control characters are in binary form, a polarity describes whether the control characters are represented in their original form (positive polarity) or opposite form (negative polarity). According to an embodiment of the present disclosure, when the control characters are aligned, bits in the same position sharing opposite values are identified.

At 340, a word aligner unit in the receiver PCS unit is configured to detect bits of commonality between the control characters. According to an embodiment of the present disclosure, the bits of commonality may include all the bits sharing commonality between the control characters or a proper subset of the bits sharing commonality between the control characters. According to an embodiment of the present disclosure, the word aligner unit is configured to detect a specified data pattern, pattern width, and polarity of bits. The receiver PCS unit equates the detection of the data pattern to a detection of one of the control characters.

FIG. 4 illustrates an example of how a word aligner unit is configured to detect bits of commonality for control characters in the HDMI 2.0 protocol. Referring back to FIG. 3, at 310, it would be recognized that the HDMI 2.0 protocol requires detection of 8 consecutive sequential control characters, where any of the 8 control characters may be represented by 10'h354, 10'h0ab, 10'h154 or 10'h2ab, in hexadecimal form. In binary form, these 4 control characters are represented as 10'b1101010100, 10'b0010101011, 10'b0101010100, and 10'b1010101011.

At 320, it would be recognized that the first control character 10'b1101010100 and the third control character 10'b0101010100 have their 7 least significant bits in common. It would also be recognized that the second control character 10'b00101010011 and the fourth control character 10'b1010101011 have their 7 least significant bits in common.

At 330, it would be recognized that the 7 least significant bits in common in the first and third control characters have the opposite polarity with the 7 least significant bits in common in the second and fourth control characters.

At 340, the word aligner unit is configured to recognize data pattern 7'h54, of pattern width 7 bits, in both positive and negative polarity.

Figure 5:
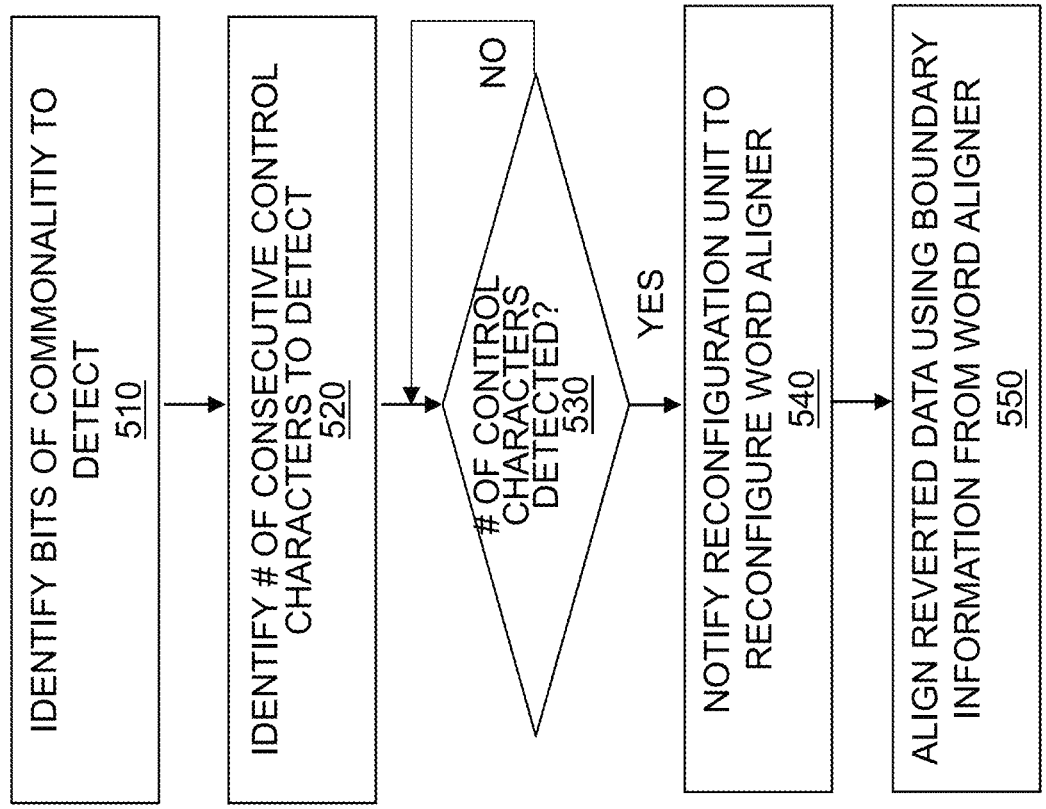
FIG. 5 is a flow chart illustrating procedures performed by a protocol pattern detector and symbol aligner unit according to an exemplary embodiment of the present disclosure.

FIG. 5 is a flow chart illustrating procedures performed by a protocol pattern detector and symbol aligner (PPDSA) unit according to an exemplary embodiment of the present disclosure. At 510, bits of commonality between control characters to be searched are identified. The PPDSA unit is configured to search and detect the identified bits of commonality. According to an embodiment of the present disclosure, the bits of commonality may be identified in a manner similarly described with reference to FIGS. 3 and 4. The PPDSA unit equates the detection of the identified bits of commonality to a detection of one of the control characters.

It should be appreciated that the bits of commonality may be of the same number or a larger number than that identified for a receiver physical coding sublayer (PCS) unit. Referring back to the HDMI 2.0 example, it may be determined that first control character 10'b1101010100 and the third control character 10'b0101010100 have their 8 least significant bits in common. It may also be recognized that the second control character 10'b00101010011 and the fourth control character 10'b1010101011 have their 8 least significant bits in common. As such, the PPDSA unit may be configured to compare each symbol against 8'h54 and 8'hab, or to recognize data pattern 8'h54, of pattern width 8 bits, in both positive and negative polarity.

At 520, a number of consecutive control characters to detect is identified. According to an embodiment of the present disclosure, the number of consecutive control characters to detect may be recognized by association with an identified standard or protocol or may be received as input by a designer. Referring to the HDMI 2.0 example, it may be determined that the number of consecutive control characters to detect is 8.

At 530, it is determined whether the predetermined number of consecutive control characters identified has been detected. If the predetermined number of consecutive control characters has not been identified, control returns to 530. If the predetermined number of consecutive control characters has been identified, control proceeds to 540.

At 540, a notification is generated to a reconfiguration unit to reconfigure and reset a word aligner unit in the receiver PCS unit.

At 550, reverted data received from the receiver PCS unit is aligned using the boundary information (boundary location) associated with the detected predetermined number of consecutive control characters received from the word aligner unit.

FIG. 6 is a flow chart illustrating procedures performed by a reconfiguration unit according to an exemplary embodiment of the present disclosure. At 610, it is determined whether an alignment lock loss event has occurred. According to an embodiment of the present disclosure, the determination may be made upon receiving a notification from a receiver or from performing a detection procedure. An alignment lock loss event may occur, for example, when a video resolution has changed in a video frame, a cable hot-plug has occurred, signal loss has been detected or another event has transpired that requires a receiver interface to perform synchronization by determining a new boundary location to align the frame of data. If an alignment lock loss event has not occurred, control returns to 610. If an alignment lock loss event has occurred, control proceeds to 620.

At 620, a receiver physical medium attachment (PMA) unit is reconfigured and reset. According to an embodiment of the present disclosure, the PMA unit is reconfigured to an appropriate bit rate or frequency band that allows it to lock to a new incoming video resolution. According to an embodiment of the present disclosure, a reset sequence after reconfiguration ensures that the receiver PMA unit initializes and functions correctly.

At 630, a receiver (PCS) unit is reconfigured and reset. According to an embodiment of the present disclosure, the receiver PCS unit is reconfigured to detect and align data according to its originally specified parameters as described with reference to FIG. 3. According to an embodiment of the present disclosure, a reset sequence after reconfiguration ensures that the receiver PCS unit initializes and functions correctly.

At 640, it is determined whether an alignment lock event has occurred. According to an embodiment of the present disclosure, the determination may be made upon receiving a notification from a protocol pattern detector and symbol aligner (PPDSA) unit. An alignment lock event may occur when a predetermined number of consecutive control characters are identified in a frame of data, and data is aligned in the frame of data in response to a boundary location associated with the identified predetermined number of consecutive control characters. If an alignment lock event has not occurred, control returns to 640. If an alignment lock event has occurred, control proceeds to 650.

At 650, a word aligner in the receiver PCS unit is reconfigured and reset. According to an embodiment of the present disclosure, the word aligner in the receiver PCS unit is reconfigured such that a subsequent alignment does not occur. The receiver PCS unit is also reset to output reverted data that has not been aligned. In an embodiment where the receiver PCS unit cannot be programmed to stop performing detection and alignment, the receiver PCS unit is programmed to identify an invalid pattern such that detection of a control character and alignment will not occur.

FIGS. 3, 5, and 6 are flow charts that illustrate embodiments of the present disclosure. The procedures described in these figures may be performed by one or more units in a receiver interface or by EDA tools implemented by one or more computer systems. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 7A:
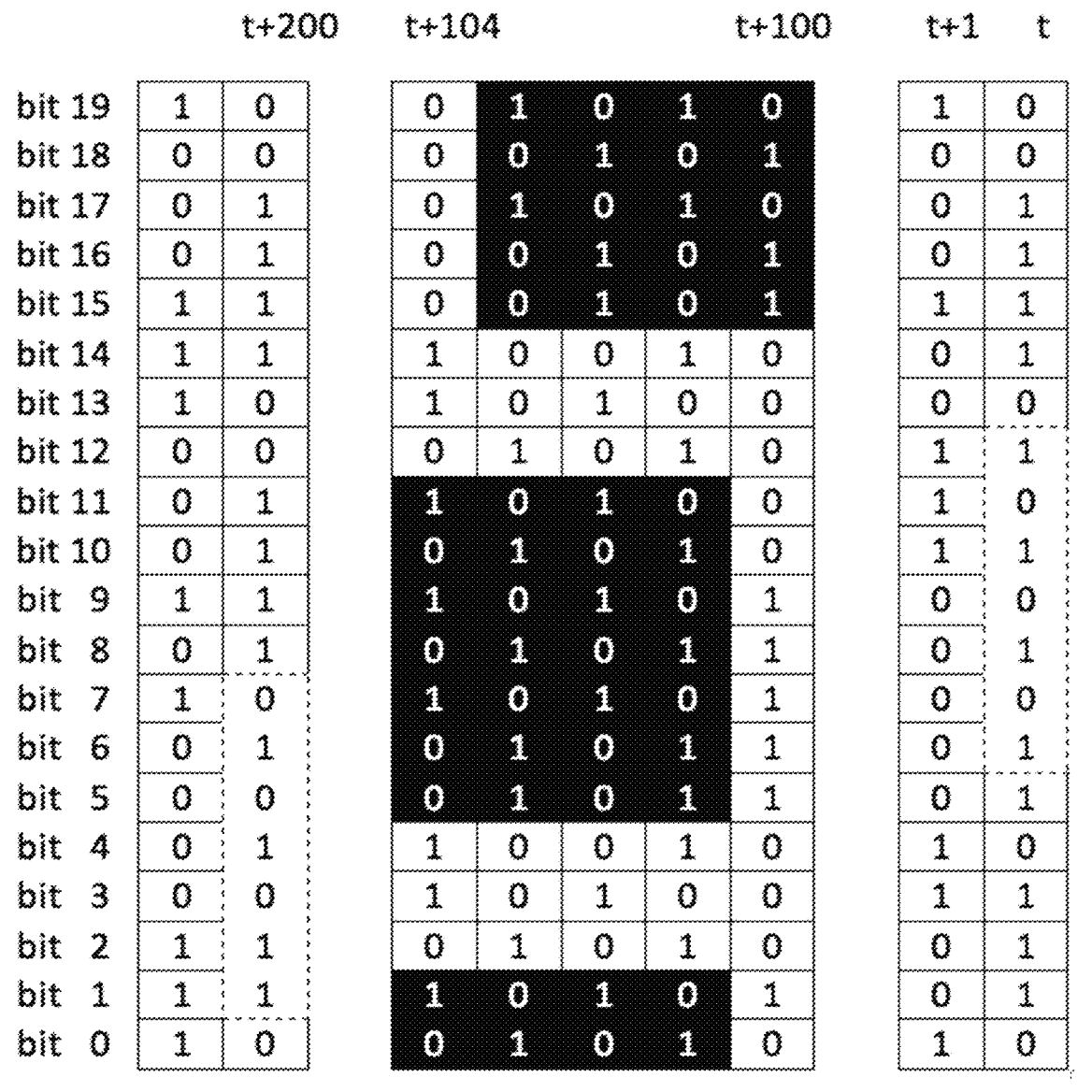

Referring back to FIG. 2, consider an example where the receiver 250 and receiver interface 200 supports the HDMI 2.0 protocol. The receiver 250 also supports 3 channels of the receiver interface 200 where each channel is configured at double width. In this embodiment, each receiver PMA unit 210 parallelizes serial data into 20 bits data (2 symbols per clock). FIG. 7A illustrates exemplary data as processed by the receiver PMA unit 210 at various times according to an exemplary embodiment of the present disclosure. The data is transmitted to the receiver PCS unit 220 which is configured to detect and align data with a 7 bit width and a 7'h54 pattern with both polarity. This pattern is common across the 4 HDMI 2.0 control characters. As shown in FIG. 7A parallelization occurs at arbitrary boundaries. The highlighted bits are all the 7 bits programmed pattern (7'h54 or 7'h2b) inclusive of undesired patterns, shown within dashed sections, and desired patterns, shown in darken sections. The pattern shown at time t is undesired because it is part of a single control character that is transmitted alone and without any other consecutive control character. The patterns shown at t+100 through t+104 are desirable because they correspond to 8 consecutive control characters.

Figure 7B:
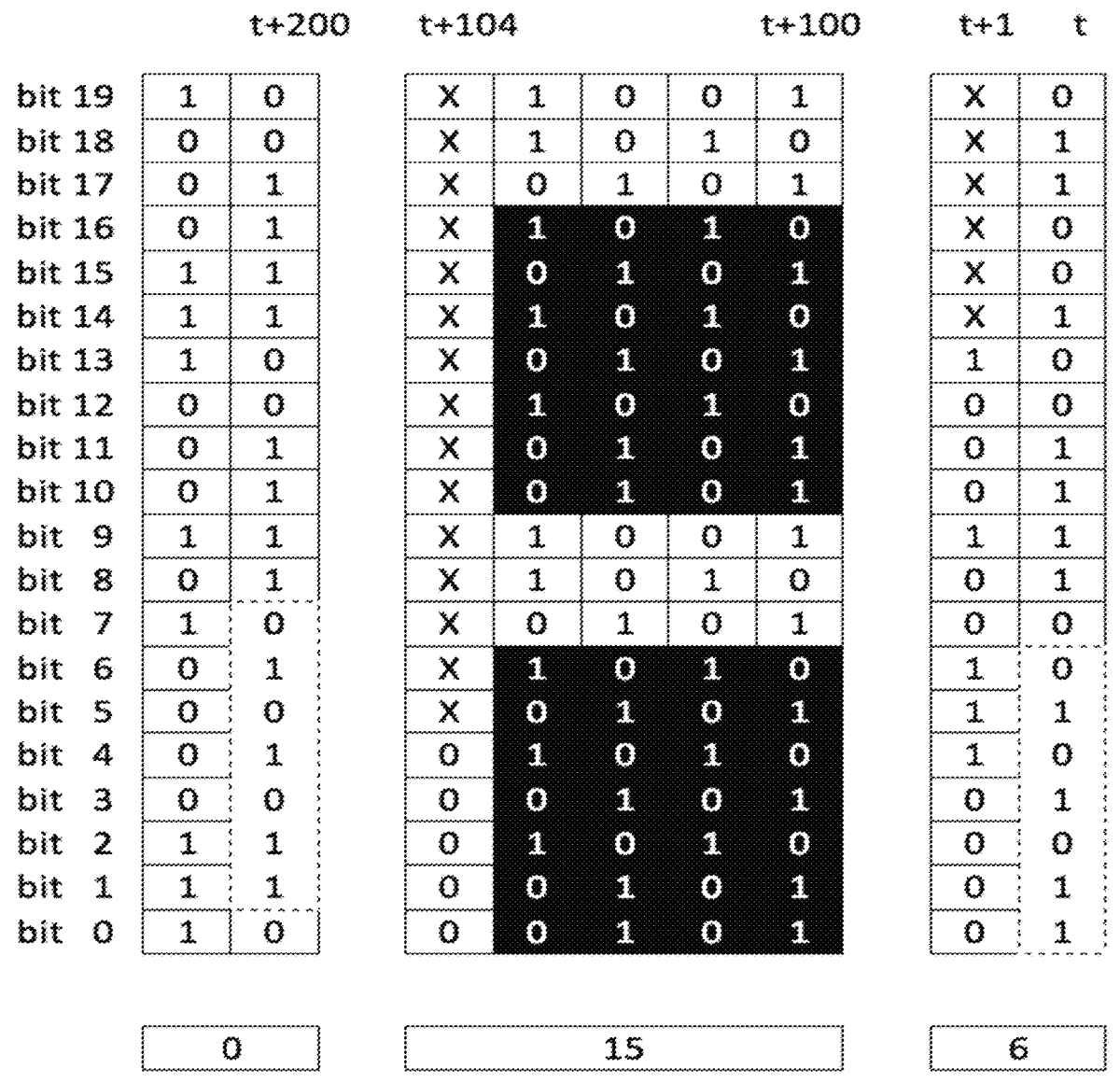

FIG. 7B illustrates data processed by the receiver PCS unit 220 prior to an alignment lock according to an exemplary embodiment of the present disclosure. The parallel data received from PMA unit 210 is realigned to meaningful character boundaries. The word aligner unit 221 is configured at synchronous state machine mode which is capable of continuously searching and immediately realigning to a programmed pattern. Each alignment is accompanied by its respective boundary output to indicate how many bits is shifted down. As shown the data at time t is shifted down by 6 bits. The data at time t+100 through t+104 is shifted down by 15 bits.

The PPDSA unit 230 receives and processes data with 1 clock latency. The PPDSA unit 230 is able to identify 8 sequential consecutive control characters. The PPDSA unit 230 generates a notification indicating that there is an alignment lock at t+104. The notification (token_detected) is transmitted to the reconfiguration unit 240 which initiates dynamic reconfiguration of the word aligner unit 221 in the receiver PCS unit 220. The reconfiguration unit 240 changes the data pattern which the word aligner unit 221 is to search to an invalid pattern, 20'haaaaa, with a width of 20 bits, and positive polarity only. The purpose of the reconfiguration is to ensure that no new alignment will occur. The likelihood of this pattern to appear is zero in a transition minimized encoding protocol like HDMI 2.0. When the word aligner unit 221 cannot be paused or shut off, the reconfiguration unit 240 reprograms the search pattern to one that is unlikely to be found to ensure no alignment. Upon receiving notification of an alignment lock, the reconfiguration unit 240 also resets the receiver PCS unit 220 to revert the alignment of data that is transmitted to the PPDSA 230. The PMA receiver 210 is not reset in order for the previously detected word boundary to remain meaningful.

Figure 7C:
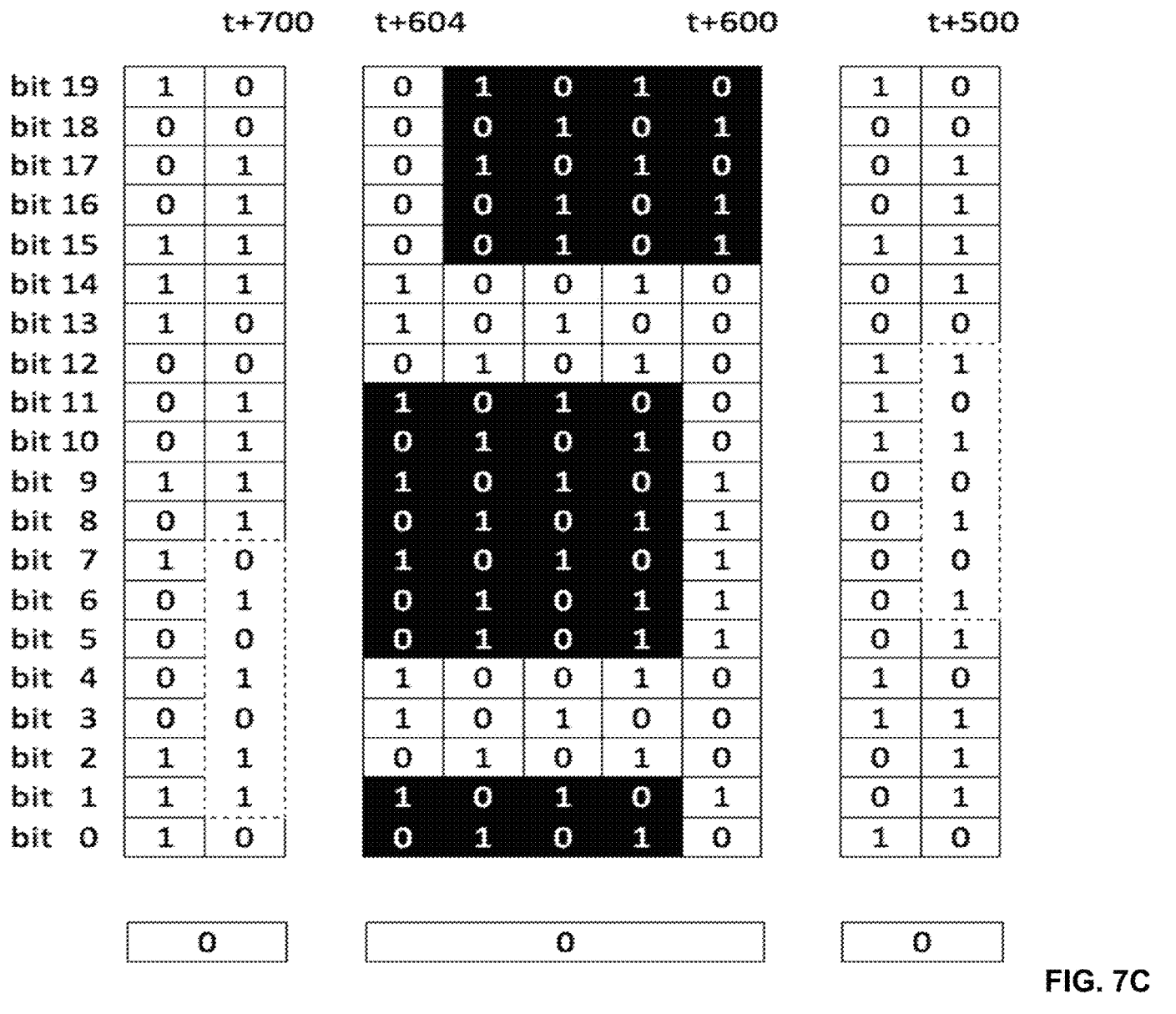

FIG. 7C illustrates data processed by the receiver PCS unit 220 after an alignment lock according to an exemplary embodiment of the present disclosure. As shown, the output at the receiver PCS unit 220 mirrors the output at the receiver PMA unit 210. The respective boundary output at FIG. 7C should be 0 at all time as the reprogrammed pattern, 20'haaaa, cannot be located.

Figure 8A:
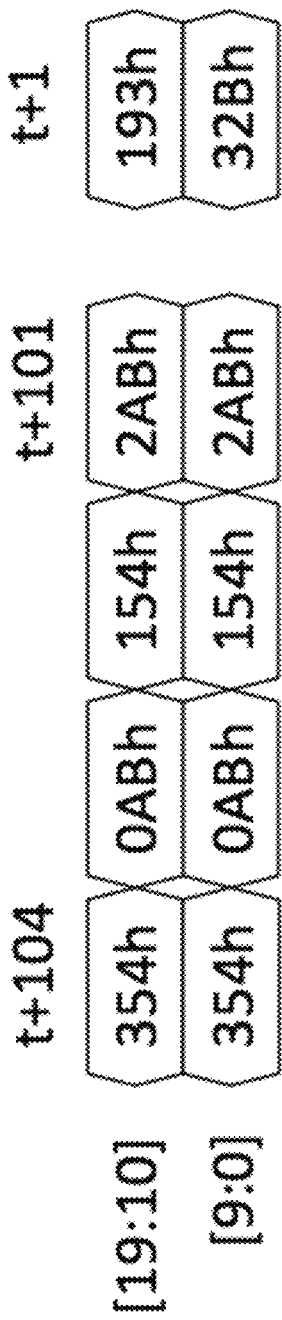
FIG. 8A illustrates data processed by the protocol pattern detector and symbol aligner unit prior to an alignment lock according to an exemplary embodiment of the present disclosure.
Figure 8B:
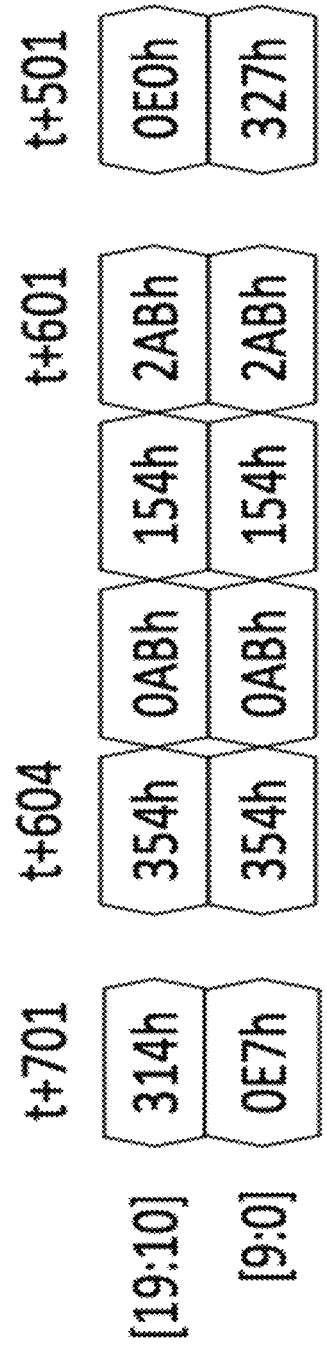
FIG. 8B illustrates data processed by the protocol pattern detector and symbol aligner unit after an alignment lock according to an exemplary embodiment of the present disclosure.

FIG. 8A illustrates data processed by the PPDSA unit 230 prior to an alignment lock according to an exemplary embodiment of the present disclosure. FIG. 8B illustrates data processed by the receiver PCS unit 220 unit after an alignment lock according to an exemplary embodiment of the present disclosure.

Figure 9:
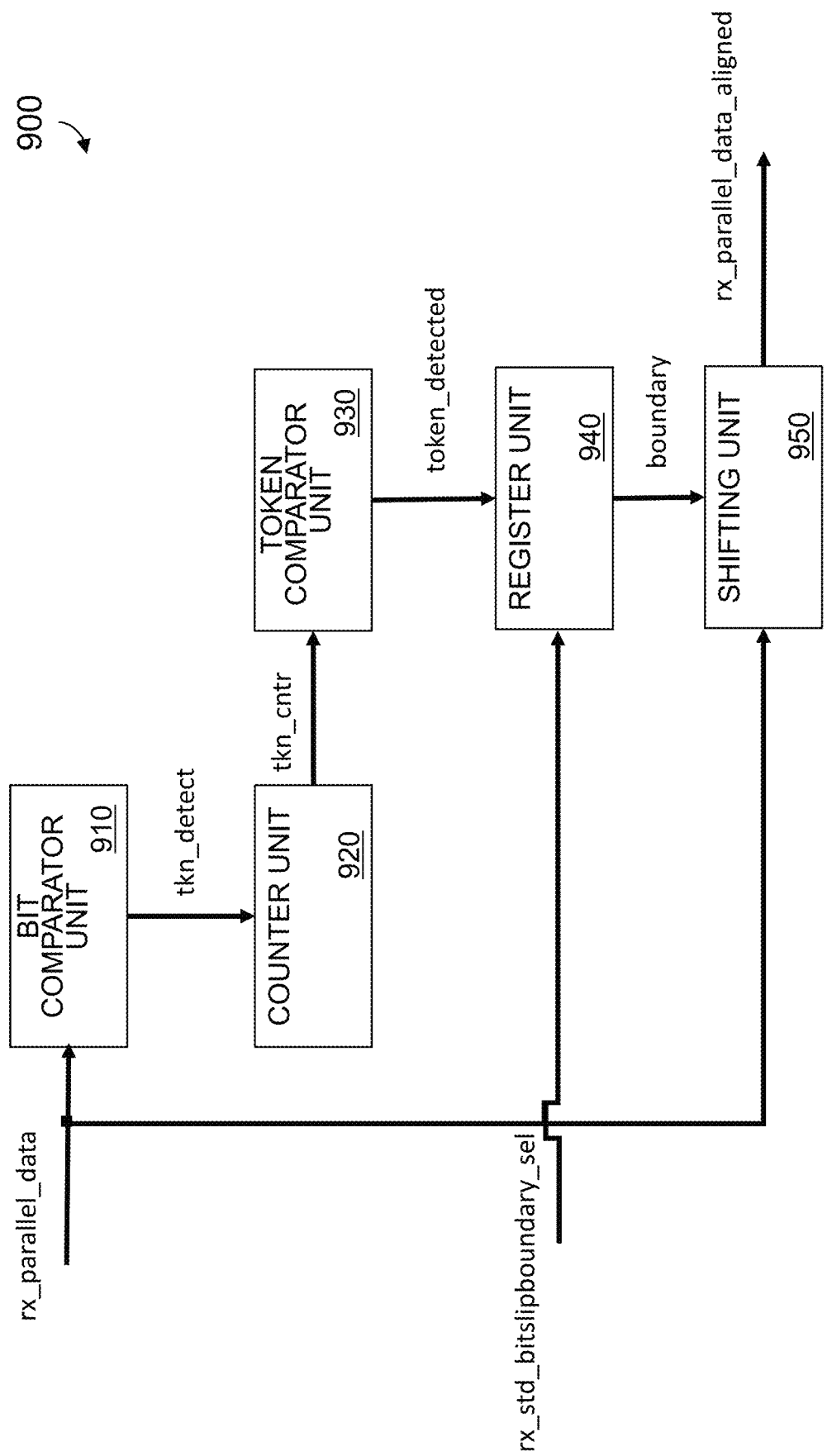
FIG. 9 is a block diagram illustrating an embodiment of a protocol pattern detector and symbol aligner unit according to an exemplary embodiment of the present disclosure.

FIG. 9 is a block diagram illustrating an embodiment of a protocol pattern detector and symbol aligner (PPDSA) unit 900 according to an exemplary embodiment of the present disclosure. The PPDSA unit 900 shown in FIG. 9 may be used to implement the PPDSA unit 230 shown in FIG. 2. The PPDSA unit 900 includes a bit comparator unit 910. The bit comparator unit 910 receives a parallel data stream from a receiver physical coding sublayer (PCS) unit. The bit comparator unit 910 compares data in the parallel data stream with identified bits that correspond to control characters to be searched. It should be appreciated that the bit comparator unit 910 may be configured to detect all the bits of all control characters or a proper subset of bits that are common to the control characters. The proper subset of bits that are common to the control characters may be a larger number than that used by a word aligner unit in the receiver PCS unit. Upon detecting a match with the identified bits, the bit comparator unit 910 equates the match with finding a control character and generates a notification.

The PPDSA unit 900 includes a counter unit 920. The counter unit 920 receives the notification when the bit comparator unit 910 detects a match. The counter unit 920 increments a token counter value by 1 each time the bit comparator unit 910 detects a match and outputs a token counter value. The token counter value saturates at a predetermined number. According to an embodiment of the disclosure where the PPDSA supports HDMI 2.0, the predetermined number is 8. When bit comparator unit 910 fails to detect a match, the counter unit 920 resets the token counter value back to 0.

The PPDSA unit 900 includes a token comparator unit 930 that receives the token counter value generated by the counter unit 920. The token comparator unit 930 examines the token counter value generated by the counter unit 920 to determine whether it has reached the predetermined number. The token comparator unit 930 generates a notification when the predetermined number has been reached. The notification is transmitted to a register unit 940. The notification is also transmitted to a reconfiguration unit to prompt the reconfiguration unit to reconfigure the receiver PCS unit as described with reference to FIG. 6.

The PPDSA unit 900 includes the register unit 940. The register unit 940 receives a word boundary information that corresponds to the parallel data stream received from the receiver PCS unit. The word boundary information indicates how many bits have been shifted for a current data input by the word aligner in the receiver PCS unit. When the register unit 940 receives a notification that the predetermined number of control characters has been detected, it stores the current word boundary information received by the receiver PCS unit and recognizes it as the correct word boundary.

The PPDSA unit 900 includes a shifting unit 950. The shifting unit 950 uses the stored word boundary in the register unit 940 to shift a data input received from the receiver PCS unit after the word aligner in the receiver PCS unit is reset to revert the data. This allows for proper alignment of the reverted data using the appropriate location of the word boundary associated with the detected predetermined number of consecutive control characters.

According to an embodiment of the present disclosure, the bit comparator unit 910, counter unit 920, and token comparator unit 930 may be referred to as the protocol pattern detector of the PPDSA unit 900. The register unit 940 and the shifting unit 950 may be referred to as the symbol aligner of the PPDSA unit 900.

Figure 10:
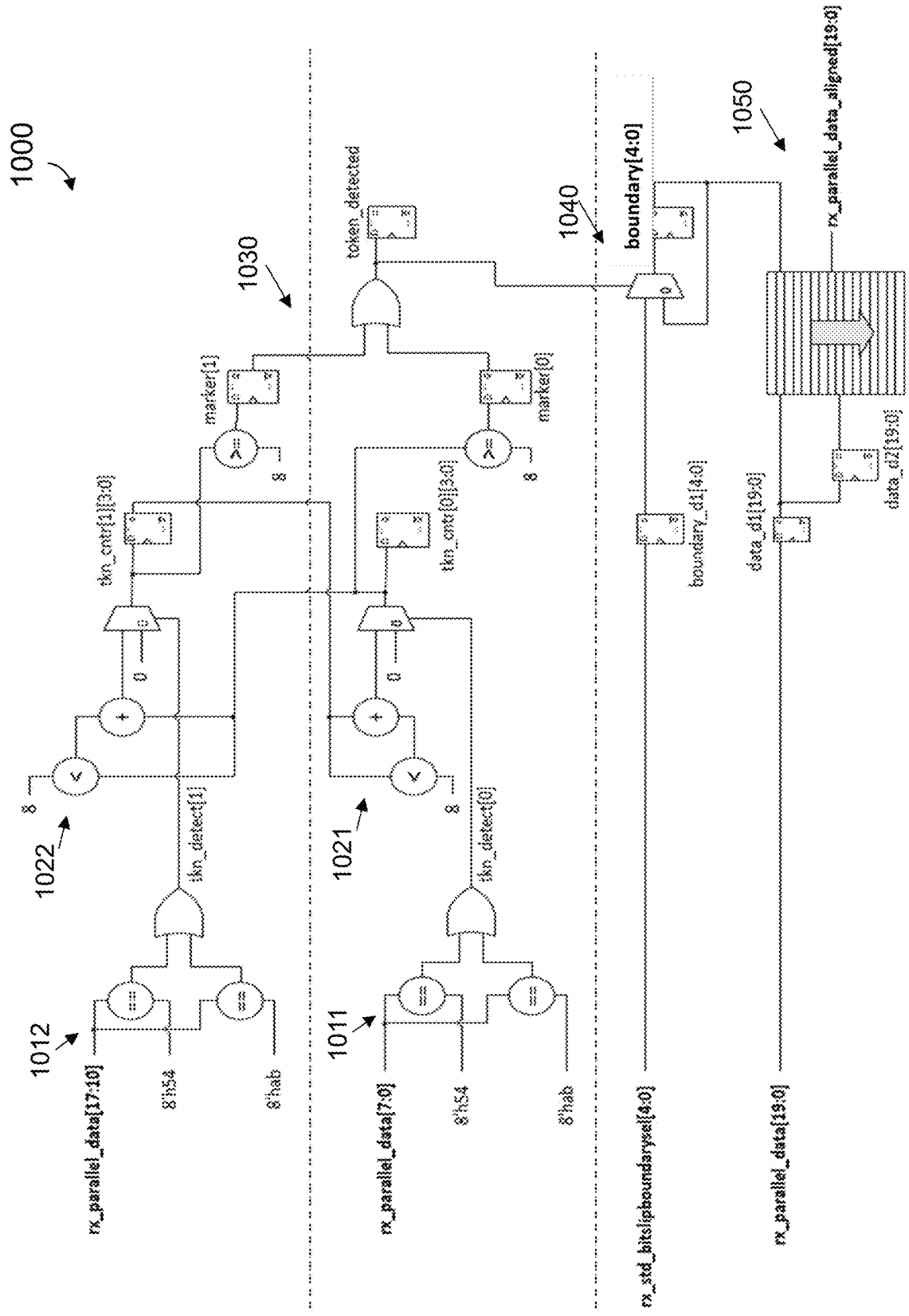
FIG. 10 is a detailed diagram illustrating an embodiment of a protocol pattern detector and symbol aligner unit according to an exemplary embodiment of the present disclosure.

FIG. 10 is a detailed diagram illustrating an embodiment of a protocol pattern detector and symbol aligner (PPDSA) unit 1000 according to an exemplary embodiment of the present disclosure. The PPDSA unit 1000 shown in FIG. 10 may be used to implement the PPDSA unit 230 shown in FIG. 2 or the PPDSA unit 900 shown in FIG. 9. As illustrated, the PPDSA unit 1000 implements a bit comparator unit 1011 and 1012, counter unit 1021 and 1022, and token comparator unit 1030 that processes two symbols, rx_parallel_data [7:0], and rx_parallel_data[17:10] at the same time.

The PPDSA unit 1000 includes a lower bit comparator unit 1011 and a higher bit comparator unit 1012. The lower bit comparator unit 1011 receives a parallel data stream, rx_parallel_data[7:0] from a receiver physical coding sublayer (PCS) unit. The lower bit comparator unit 1011 compares data in the parallel data stream with identified bits, 8'h54 and 8'hab that correspond to control characters to be searched. Upon detecting a match with the identified bits, the lower bit comparator unit 1011 equates the match with finding a control character and generates a notification, tkn_detect[0].

The upper bit comparator unit 1012 receives a parallel data stream, rx_parallel_data[17:10] from a receiver physical coding sublayer (PCS) unit. The upper bit comparator unit 10121 compares data in the parallel data stream with identified bits, 8'h54 and 8'hab that correspond to control characters to be searched. Upon detecting a match with the identified bits, the upper bit comparator unit 1012 equates the match with finding a control character and generates a notification, tkn_detect[1].

The PPDSA unit 1000 includes a lower counter unit 1021 and a higher counter unit 1022. The lower counter unit 1021 receives the notification, tkn_detect[0], when the lower bit comparator unit 1011 detects a match. The lower counter unit 1021 increments a token counter value by 1 each time the lower bit comparator unit 1011 detects a match and outputs a token counter value, tkn_cntr[0][3:0]. The token counter value saturates at a predetermined number of 8. When the lower bit comparator unit 1011 or higher bit comparator unit 1012 fail to detect a match, the lower counter unit 1021 resets the token counter value back to 0.

The higher counter unit 1022 receives the notification, tkn_detect[1], when the higher bit comparator unit 1012 detects a match. The higher counter unit 1022 increments a token counter value by 1 each time the higher bit comparator unit 1012 detects a match and outputs a token counter value, tkn_cntr[1][3:0]. The token counter value saturates at a predetermined number of 8. When the lower bit comparator unit 1011 or higher bit comparator unit 1012 fail to detect a match, the higher counter unit 1022 resets the token counter value back to 0. Matches from the lower counter unit 1021 are reflected in the token counter value generated by the higher counter unit 1022 at the same clock cycle. Matches from the higher counter unit 1022 are reflected in the token counter value generated by the lower counter unit 1021 at the next clock cycle.

The token comparator unit 1030 examines the token counter values, tkn_cntr[0][3:0] and tkn_contr[1][3:0] to determine whether it has reached the predetermined number of 8. The token comparator unit 1030 generates a notification, token_detected, when the predetermined number has been reached. The notification is transmitted to a register unit 1040. The notification is also transmitted to a reconfiguration unit to prompt the reconfiguration unit to reconfigure the receiver PCS unit as described with reference to FIG. 6.

The PPDSA unit 1000 includes the register unit 1040. The register unit 1040 receives word boundary information, rx_std_bitslipboundarysel[4:0], that corresponds to the parallel data stream received from the receiver PCS unit. The word boundary information (boundary location) indicates how many bits have been shifted for a current data input by the word aligner in the receiver PCS unit. When the register unit 1040 receives a notification, token_detected, that the predetermined number of control characters has been detected, it stores the current word boundary information received by the receiver PCS unit and recognizes it as the correct word boundary.

The PPDSA unit 1000 includes a shifting unit 1050. The shifting unit 1050 uses the stored word boundary in the register unit 1040 to shift a data input received from the receiver PCS unit after the word aligner in the receiver PCS unit is reset to revert the data. This allows for proper alignment of the reverted data using the appropriate location of the word boundary associated with the detected predetermined number of consecutive control characters.

Figure 11:
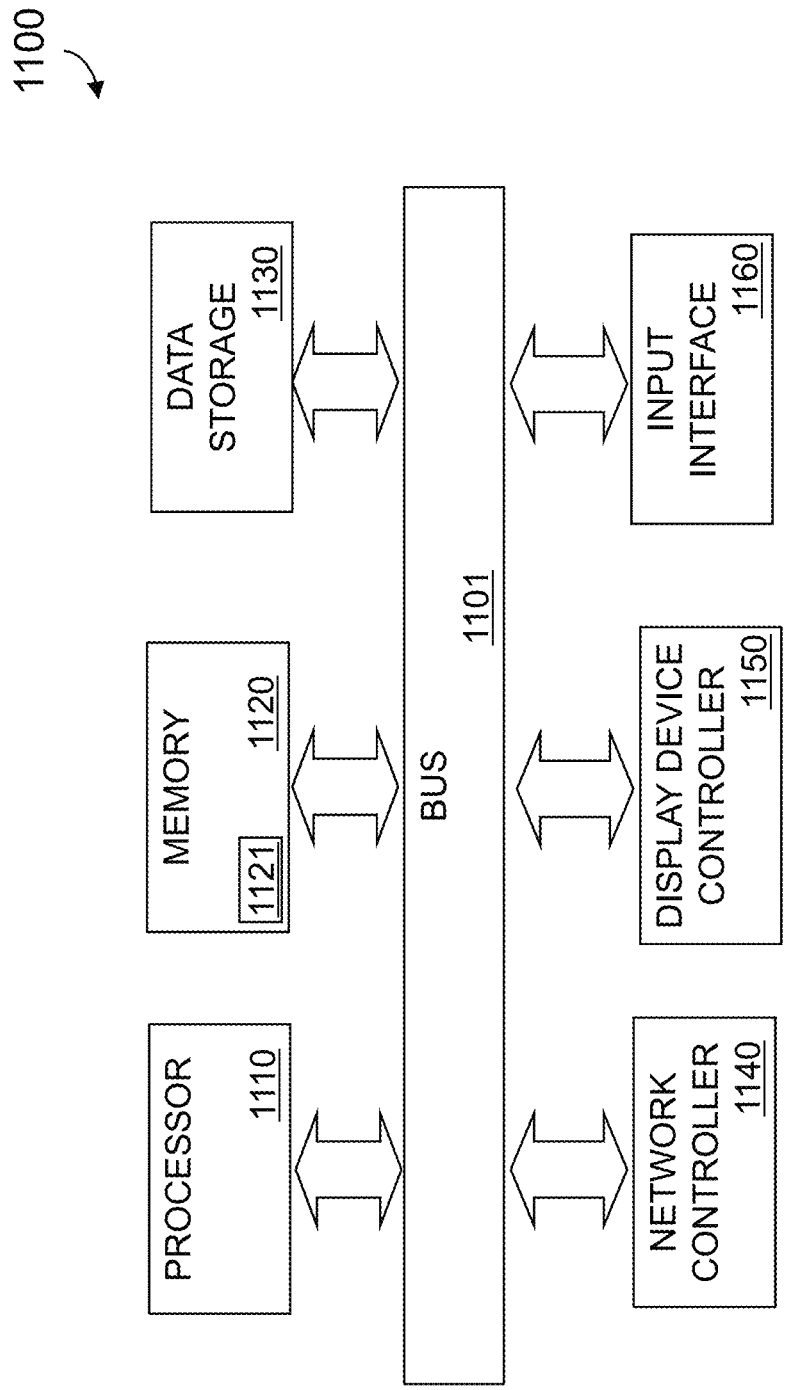
FIG. 11 is a block diagram of a computer system implementing a system designer according to an exemplary embodiment of the present disclosure.

FIG. 11 is a block diagram of an exemplary computer system 1100 in which an example embodiment of the present disclosure resides. The computer system 1100 includes a processor 1110 that process data signals. The processor 1110 is coupled to a bus 1101 or other switch fabric that transmits data signals between processor 1110 and other components in the computer system 1100. The computer system 1100 includes a memory 1120. The memory 1120 may store instructions and code represented by data signals that may be executed by the processor 1110. A data storage device 1130 is also coupled to the bus 1101.

A network controller 1140 is coupled to the bus 1101. The network controller 1140 may link the computer system 1100 to a network of computers (not shown) and supports communication among the machines. A display device controller 1150 is coupled to the bus 1101. The display device controller 1150 allows coupling of a display device (not shown) to the computer system 1100 and acts as an interface between the display device and the computer system 1100. An input interface 1160 is coupled to the bus 1101. The input interface 1160 allows coupling of an input device (not shown) to the computer system 1100 and transmits data signals from the input device to the computer system 1100.

A system designer 1121 may reside in the memory 1120 and be executed by the processor 1110. The system designer 1121 may operate to allow a designer to input a description of a system to be implemented on a target device. The system designer 1121 may include a library of soft intellectual property system design cores (soft IP cores). The soft IP cores may be synthesizable register transfer level (RTL). Synthesizable soft IP cores may be in a hardware description language (HDL) or a different format that may be converted into HDL. The soft IP cores may describe components or circuitry that may be implemented on the target device. According to an embodiment of the present disclosure, the system designer 1121 allows a designer to select soft IP cores that may be implemented by resources on the programmable fabric of the target device to be used in conjunction with one or more hard intellectual property blocks on the target device.

Figure 12:
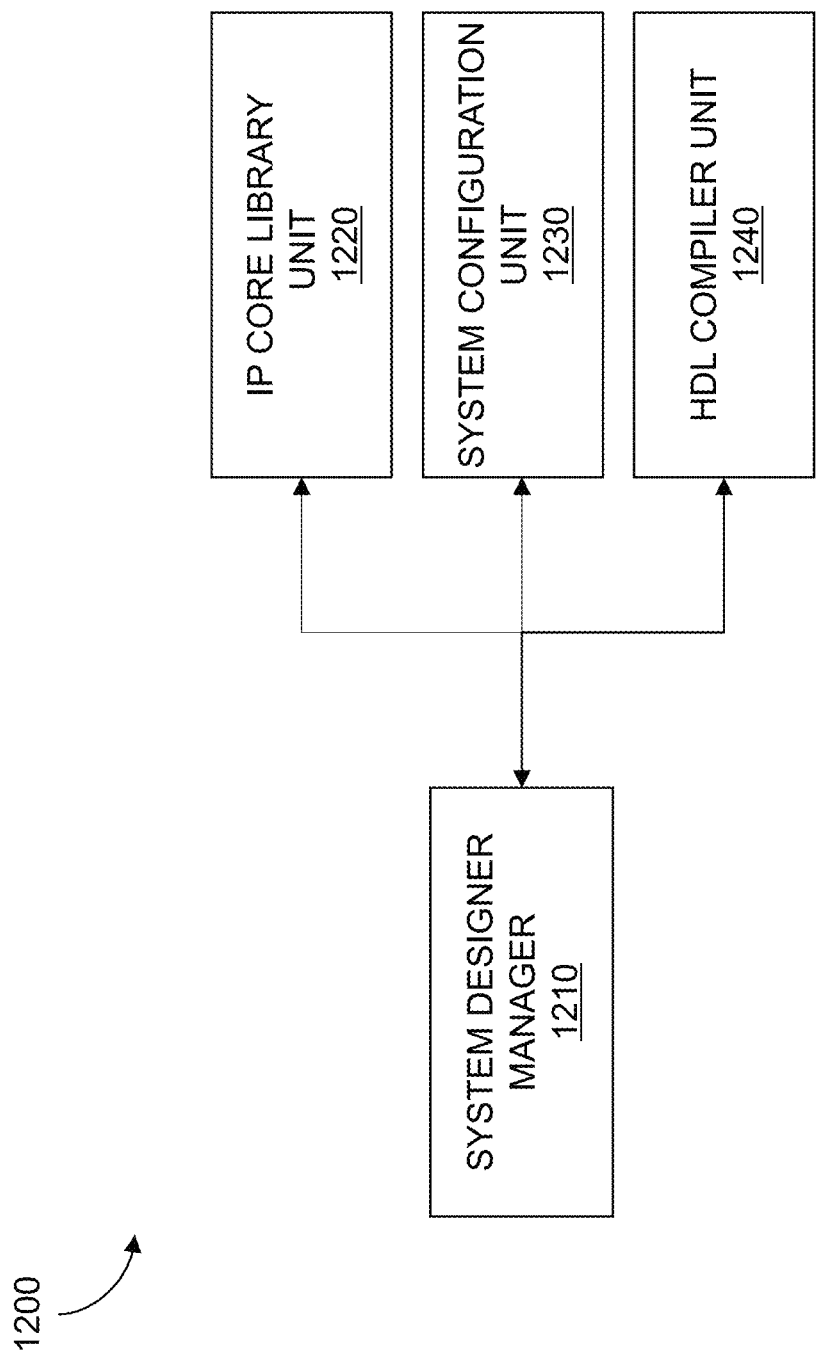
FIG. 12 is a block diagram of a system designer according to an exemplary embodiment of the present disclosure.

FIG. 12 illustrates a system designer 1200 according to an embodiment of the present disclosure. The system designer 1200 may be an EDA tool for designing a system on a target device such as an FPGA or other programmable logic device. FIG. 12 illustrates modules implementing an embodiment of the system designer 1200. According to one embodiment, the modules represent software modules and system design may be performed by one or more computer systems such as the one illustrated in FIG. 11 executing sequences of instructions represented by the modules shown in FIG. 12. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software.

The system designer 1200 includes a system designer manager 1210. The system designer manager 1210 is connected to and transmits data between the components of the system designer 1200. The system designer manager 1210 may provide an interface for a designer to input a description of a system to be implemented on a target device. The description may be in the format of a specification, high-level synthesis language, HDL, and/or other format or a combination of formats.

The system designer 1200 includes an intellectual property (IP) core library unit 1220. The IP core library unit 1220 includes a plurality of soft IP cores that describe components or circuitry that may be selected by a designer to be implemented on the target device. According to an embodiment of the present disclosure, soft IP cores that implement a protocol pattern detector and symbol aligner (PPDSA) unit and a reconfiguration unit are selectable from the IP core library unit 1220. A designer may select soft IP cores to implement the PPDSA unit and the reconfiguration unit using resources on the programmable fabric of the target device. The PPDSA unit and reconfiguration unit may be used with a receiver physical medium attachment (PMA) unit and a receiver physical coding sublayer (PCS) unit, implemented by hard intellectual property (IP) blocks on the target device, to support a receiver using the HDMI 2.0 protocol.

The system designer 1200 includes a system configuration unit 1230. The system configuration unit 1230 may be used to configure soft IP cores or hard IP blocks in the system. For example, the system configuration unit 1230 may be used by the designer to identify control characters to search, patterns of commonality of control characters to search, the width and polarity of the patterns of commonality of control characters to search, the number of consecutive control characters to search for in a frame data, and other configuration parameters for the soft IP cores and hard IP blocks of the system. The system configuration unit 1230 may also perform some of the procedures described with reference to FIGS. 3 through 5.

The system designer 1200 includes a hardware description language (HDL) compilation unit 1240. The hardware description language compilation unit 1240 performs synthesis, placement, routing, and timing analysis on a HDL of the system and generates a program file. The program file may be used to program the target device to physical transform it into the system.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 13:
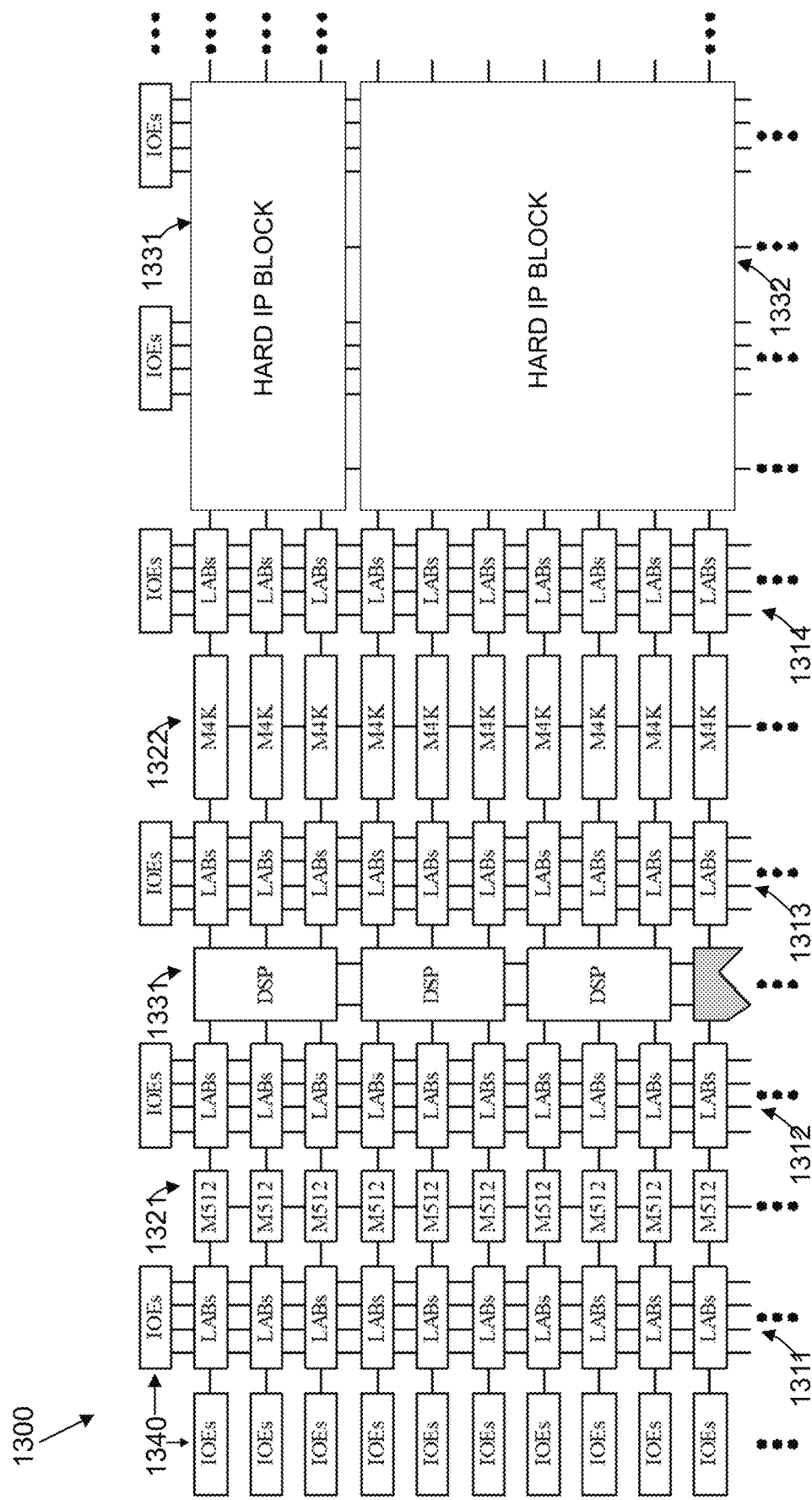
FIG. 13 illustrates an exemplary target device according to an exemplary embodiment of the present disclosure.

FIG. 13 illustrates a device 1300 that may be used to implement a target device according to an embodiment of the present disclosure. The device 1300 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present disclosure, the logic block may operate similarly to an adaptive logic module (ALM), such as those found in Stratix devices manufactured by Altera Corporation. LABs are grouped into rows and columns across the device 1300. Columns of LABs are shown as 1311-1314. It should be appreciated that the logic block may include additional or alternate components. The LABs 1311-1314 are resources on the device 1300 that make up its programmable fabric.

The device 1300 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1300. Columns of memory blocks are shown as 1321-1322.

The device 1300 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1300 and are shown as 1331.

The device 1300 includes a plurality of hard intellectual property (IP) blocks 1331-1332. As illustrated in FIG. 13, the hard IP blocks 1331-1332 resides next to the target device's programmable fabric. The hard IP blocks 1331-1332 may be pre-designed to provide rich functions while lowering power and cost and freeing up logic resources for product differentiation. The hard IP blocks 1331-1332 may implement components such as multi-gigabit transceivers and processor cores. According to an embodiment of the present disclosure, the hard IP blocks 1331-1332 may be used to implement a receiver physical medium attachment (PMA) unit and a receiver physical coding sublayer (PCS) unit.

The device 1300 includes a plurality of input/output elements (IOEs) 1340. Each IOE feeds an IO pin (not shown) on the device 1300. The IOEs 1340 are located at the end of LAB rows and columns around the periphery of the device 1300. Each IOE may include a bidirectional IO buffer and a plurality of registers for registering input, output, and output-enable signals.

The device 1300 may include routing resources such as LAB local interconnect lines, row interconnect lines ("H-type wires"), and column interconnect lines ("V-type wires") (not shown) to route signals between components on the target device.

The following examples pertain to further embodiments. In one embodiment, a method for performing pattern detection and alignment on a programmable logic device includes configuring a word aligner unit, implemented by a hard intellectual property block, to detect a plurality of control characters by recognizing a proper subset of bits that are common among the plurality of control characters. It is determined whether a predetermined number of consecutive control characters has been detected in a frame of data. A boundary location associated with a detected predetermined number of consecutive control characters from the word aligner unit is determined. The frame of data is aligned in response to the boundary location associated with the detected predetermined number of consecutive control characters.

In a further embodiment, the method wherein the hard intellectual property block is implemented by components outside a programmable fabric of the programmable logic device.

In a further embodiment, the method wherein the word aligner unit is configurable to recognize only a single data pattern at a predetermined bit width.

In a further embodiment, the method wherein configuring the word aligner unit includes defining a data pattern for the word aligner to recognize, defining a width for the data pattern, and setting a polarity of recognition for the data pattern.

In a further embodiment, the method wherein the word aligner identifies a boundary location associated with each control character detected, and aligns data in response to the boundary location associated with each of the control character detected.

In a further embodiment, the method wherein determining whether the predetermined number of consecutive control characters has been detected is performed by a protocol pattern detector and symbol aligner unit implemented by soft logic on the programmable logic device.

In a further embodiment, the method wherein the protocol pattern detector and symbol aligner unit recognizes a greater number of bits that are common among the plurality of control characters than a number of bits recognized by the word aligner unit.

In a further embodiment, the method wherein identifying the boundary location associated with the detected predetermined number of consecutive control characters comprises equating the boundary location identified by the word aligner unit at a time the predetermined number of consecutive control characters has been detected as the boundary location associated with the detected predetermined number of consecutive control characters.

In a further embodiment, the method further comprising re-configuring the word aligner unit to recognize a combination of bits less common than the proper subset of bits that are common among the plurality of control characters in response to determining that the predetermined number of consecutive control characters has been detected in a frame of data.

In a further embodiment, the method further comprising reverting the data to an unaligned state in response to determining that the predetermined number of consecutive control characters has been detected in the frame of data.

In a further embodiment, the method further comprising re-configuring the word aligner to recognize the proper subset of bits that are common among the plurality of control characters in response to determining that a frame of data requires synchronizing.

In a further embodiment, the method wherein the frame of data requires synchronizing when a signal to a receiver is lost.

In a further embodiment, a method for performing pattern detection and alignment on a programmable logic device includes determining whether a predetermined number of consecutive control characters has been detected in a frame of data. A boundary location associated with a detected predetermined number of consecutive control characters is determined from a word aligner unit, implemented by a hard intellectual property block, that identifies a boundary location associated with each control character detected. The word aligner unit is adjusted to prevent it from detecting control characters. The frame of data is aligned in response to the boundary location associated with the detected predetermined number of consecutive control characters.

In a further embodiment, the method wherein the hard intellectual property block is implemented by components outside a programmable fabric of the programmable logic device.

In a further embodiment, the method wherein the word aligner unit is configurable to recognize only a single data pattern at a predetermined bit width.

In a further embodiment, the method wherein the word aligner unit aligns data in response to the boundary location associated with each of the control character detected.

In a further embodiment, the method wherein determining whether the predetermined number of consecutive control characters has been detected is performed by a protocol pattern detector and symbol aligner unit implemented by soft logic on the programmable logic device.

In a further embodiment, the method wherein identifying the boundary location associated with the detected predetermined number of consecutive control characters comprises equating the boundary location identified by the word aligner unit at a time the predetermined number of consecutive control characters has been detected as the boundary location associated with the detected predetermined number of consecutive control characters.

In a further embodiment, the method wherein adjusting the word aligner unit comprises configuring the word aligner unit to recognize a combination of bits that would not be detected.

In a further embodiment, the method further comprising reverting the data to an unaligned state in response to determining that the predetermined number of consecutive control characters has been detected in the frame of data.

In a further embodiment, a receiver interface implemented on a programmable logic device includes a word aligner unit that detects a plurality of control characters by recognizing a proper subset of bits that are common among the plurality of control characters, and that identifies a boundary location associated with each of the plurality of control character detected in a frame of data, wherein the word aligner unit is implemented by a hard intellectual property block. The receiver interface also includes a protocol pattern detector and symbol aligner unit that determines when a predetermined number of consecutive control characters has been detected in the frame of data, and that aligns the frame of data in response to a boundary location associated with the detected predetermined number of consecutive control characters identified by the word aligner unit, wherein the protocol pattern detector and symbol aligner unit is implemented by programmable resources on the programmable logic device.

In a further embodiment, the receiver interface wherein the hard intellectual property block is implemented by components outside a programmable fabric of the programmable logic device.

In a further embodiment, the receiver interface further comprises a reconfiguration unit that re-configures the word aligner unit to recognize a combination of bits less common than the proper subset of bits that are common among the plurality of control characters in response to determining that the predetermined number of consecutive control characters has been detected in a frame of data, wherein the reconfiguration unit is implemented by programmable resources on the programmable logic device.

In a further embodiment, the receiver interface wherein the reconfiguration unit further reconfigures the word aligner to recognize the proper subset of bits that are common among the plurality of control characters in response to determining that another frame of data requires synchronizing.

In a further embodiment, the receiver interface wherein the reconfiguration unit prompts the word aligner unit to revert the frame of data to an unaligned state in response to determining that the predetermined number of consecutive control characters has been detected in the frame of data.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for performing pattern detection and alignment, the method comprising:
configuring a word aligner unit, implemented by a hard intellectual property block, to detect a plurality of control characters by recognizing a proper subset of bits that are common among the plurality of control characters;
determining whether a predetermined number of consecutive control characters has been detected in a frame of data;
identifying a boundary location associated with each one of a detected predetermined number of consecutive control characters from the word aligner unit; and
aligning the frame of data in response to the boundary location associated with each of the detected predetermined number of consecutive control characters.

2. The method of claim 1, wherein the hard intellectual property block is implemented by components outside a programmable fabric of a programmable logic device.

3. The method of claim 1, wherein the word aligner unit is configurable to recognize only a single data pattern at a predefined bit width.

4. The method of claim 1, wherein configuring the word aligner unit comprises:
defining a data pattern for the word aligner to recognize;
defining a width for the data pattern; and
setting a polarity of recognition for the data pattern.

5. The method of claim 1, wherein determining whether the predetermined number of consecutive control characters has been detected is performed by a protocol pattern detector and symbol aligner unit implemented by soft logic on a programmable logic device.

6. The method of claim 5, wherein the protocol pattern detector and symbol aligner unit recognizes a greater number of bits that are common among the plurality of control characters than a number of bits recognized by the word aligner unit.

7. The method of claim 1, wherein identifying the boundary location associated with each one of the detected predetermined number of consecutive control characters comprises equating the boundary location identified by the word aligner unit at a time the predetermined number of consecutive control characters has been detected as the boundary location associated with the detected predetermined number of consecutive control characters.

8. The method of claim 1 further comprising reverting the data to an unaligned state in response to determining that the predetermined number of consecutive control characters has been detected in the frame of data.

9. The method of claim 1 further comprising re-configuring the word aligner unit to recognize a combination of bits less common than the proper subset of bits that are common among the plurality of control characters in response to determining that the predetermined number of consecutive control characters has been detected in a frame of data.

10. The method of claim 9 further comprising re-configuring the word aligner to recognize the proper subset of bits that are common among the plurality of control characters in response to determining that a frame of data requires synchronizing.

11. The method of claim 10, wherein the frame of data requires synchronizing when a signal to a receiver is lost.

12. A method for performing pattern detection and alignment, the method comprising:
determining whether a predetermined number of consecutive control characters has been detected in a frame of data;
identifying a boundary location associated with a detected predetermined number of consecutive control characters from a word aligner unit, implemented by a hard intellectual property block, that identifies a boundary location associated with each control character detected;
adjusting the word aligner unit to prevent the word aligner unit from detecting control characters; and
aligning the frame of data in response to the boundary location associated with the detected predetermined number of consecutive control characters.

13. The method of claim 12, wherein the hard intellectual property block is implemented by components outside a programmable fabric of a programmable logic device.

14. The method of claim 12, wherein the word aligner unit is configurable to recognize only a single data pattern at a predefined bit width.

15. The method of claim 12, wherein the word aligner unit aligns data in response to the boundary location associated with each of the control characters detected.

16. The method of claim 15 further comprising reverting the data to an unaligned state in response to determining that the predetermined number of consecutive control characters has been detected in the frame of data.

17. The method of claim 12, wherein determining whether the predetermined number of consecutive control characters has been detected is performed by a protocol pattern detector and symbol aligner unit implemented by soft logic on a programmable logic device.

18. The method of claim 12, wherein identifying the boundary location associated with the detected predetermined number of consecutive control characters comprises equating the boundary location identified by the word aligner unit at a time the predetermined number of consecutive control characters has been detected as the boundary location associated with the detected predetermined number of consecutive control characters.

19. The method of claim 12, wherein adjusting the word aligner unit comprises configuring the word aligner unit to recognize a combination of bits that would not be detected.

20. A receiver interface implemented on a programmable logic device, comprising:
a word aligner unit that detects a plurality of control characters by recognizing a proper subset of bits that are common among the plurality of control characters, and that identifies a boundary location associated with each of the plurality of control characters detected in a frame of data, wherein the word aligner unit is implemented by a hard intellectual property block; and
a protocol pattern detector and symbol aligner unit that determines when a predetermined number of consecutive control characters has been detected in the frame of data, and that aligns the frame of data in response to a boundary location associated with the detected predetermined number of consecutive control characters identified by the word aligner unit, wherein the protocol pattern detector and symbol aligner unit is implemented by programmable resources on the programmable logic device.

21. The receiver interface of claim 20, wherein the hard intellectual property block is implemented by components outside a programmable fabric of the programmable logic device.

22. The receiver interface of claim 20 further comprising a reconfiguration unit that re-configures the word aligner unit to recognize a combination of bits less common than the proper subset of bits that are common among the plurality of control characters in response to determining that the predetermined number of consecutive control characters has been detected in a frame of data, wherein the reconfiguration unit is implemented by programmable resources on the programmable logic device.

23. The receiver interface of claim 22, wherein the reconfiguration unit further reconfigures the word aligner unit to recognize the proper subset of bits that are common among the plurality of control characters in response to determining that another frame of data requires synchronizing.

24. The receiver interface of claim 22, wherein the reconfiguration unit prompts the word aligner unit to revert the frame of data to an unaligned state in response to determining that the predetermined number of consecutive control characters has been detected in the frame of data.

\* \* \* \* \*